United States Patent

Omori et al.

[11] Patent Number: 5,167,775
[45] Date of Patent: Dec. 1, 1992

[54] METHOD FOR RECOVERY OF SOLVENT USED IN PRODUCTION OF POLYARYLENE SULFIDE

[75] Inventors: Masao Omori; Yoshinari Koyama; Daigo Shirota, all of Ichihara, Japan

[73] Assignee: Idemitsu Petrochemical Co., Ltd., Japan

[21] Appl. No.: 422,172

[22] Filed: Oct. 16, 1989

[30] Foreign Application Priority Data

Oct. 18, 1988 [JP] Japan .................. 63-263751

[51] Int. Cl.$^5$ .............................. B01D 3/06; C08F 6/10
[52] U.S. Cl. ........................................ 203/74; 203/77; 203/80; 203/81; 203/88; 203/DIG. 9; 203/DIG. 19; 528/388; 528/501; 548/555
[58] Field of Search .................. 203/88, 71, 74, 77, 203/80, 81, 72, DIG. 9, DIG. 19; 548/555; 528/388, 501

[56] References Cited

U.S. PATENT DOCUMENTS

| | | | |
|---|---|---|---|
| 3,658,659 | 4/1972 | Cottle | 548/555 |
| 3,783,138 | 1/1974 | Miles et al. | 528/388 |
| 3,800,845 | 4/1974 | Scoggin | 528/388 |
| 3,941,664 | 3/1976 | Scoggin . | |
| 3,956,060 | 5/1976 | Scoggin | 528/388 |
| 4,056,515 | 11/1977 | Vidaurri | 528/388 |
| 4,060,520 | 11/1977 | Irvin | 528/383 |
| 4,066,632 | 1/1978 | Anderson | 528/388 |
| 4,430,163 | 2/1984 | Albers et al. | 203/88 |
| 4,472,585 | 9/1984 | Cleary | 548/555 |
| 4,976,825 | 11/1990 | Iwasaki et al. | 203/73 |

FOREIGN PATENT DOCUMENTS

| | | |
|---|---|---|
| 0265524 | 5/1988 | European Pat. Off. . |
| 0202537 | 11/1988 | European Pat. Off. . |
| 2445239 | 4/1975 | Fed. Rep. of Germany . |
| 3240725 | 5/1983 | Fed. Rep. of Germany . |
| 61-53324 | 3/1986 | Japan . |
| 62-253624 | 11/1987 | Japan . |

OTHER PUBLICATIONS

Patent Abstracts of Japan, vol. 10, No. 214 (C-362) (2270), Jul 25, 1986 of JP-A-6153324 (Toyo Soda Mfg.) Mar. 17, 1986.
Patent Abstracts of Japan, vol. 12, No. 132 (C-490) (2979), Jul. 25, 1988 of JP-A-62253624 (Kureha Chem. Ind.) Nov. 11, 1987.

*Primary Examiner*—Wilbur Bascomb, Jr.
*Attorney, Agent, or Firm*—Nikaido, Marmelstein, Murray & Oram

[57] ABSTRACT

The present invention provides a method for the recover of a solvent used in the production of a polyarylene sulfide according to which the deterioration of the solvent is low and the recovery rate is high, wherein a mixed liquid, mainly composed of the solvent used in the production of the polyarylene sulfide, and generated from the process of producing the polyarylene sulfide, is subjected to a flash evaporating operation to separate the mixed liquid into a flashed vapor (A) and a flashed residue (B), and then the flashed vapor is rectified (A).

9 Claims, 1 Drawing Sheet

METHOD FOR RECOVERY OF SOLVENT USED IN PRODUCTION OF POLYARYLENE SULFIDE

BACKGROUND OF THE INVENTION (1) Field of the Invention

The present invention relates to a method for recovery of solvent which has been used in the production of a polyarylene sulfide. More particularly, it relates to a method according to which a solvent which has been used in the production of a polyarylene sulfide can be efficiently and stably recovered.

(2) Description of the Related Art

In general, solvents used for the production of a polyarylene sulfide, such as N-methylpyrrolidone, are expensive.

Therefore, in order to reduce production cost, it is necessary to recover the solvent used for the production of a polyarylene sulfide from a mixed liquid, mainly composed of the solvent, and generated in respective steps in the production of a polyarylene sulfide.

The mixed liquid, mainly composed of solvents, which is generated in respective steps of the production of a polyarylene sulfide includes, for example, (1) the solvent solution generated at a step of separating a polymer and a precipitate from a reaction mixture after the polymerization reaction of polyarylene sulfide, (2) a washing liquid generated at the step of washing the polymerized polyarylene sulfide, or (3) a mixture of these solvent solutions and washing liquid.

Such mixed liquid (mainly composed of a solvent used for the production of a polyarylene sulfide) normally contains impurities, such as unreacted monomers, oligomers, solvent deterioration products, and, in some case, polymerization aids, in addition to the solvent.

Therefore, in order to recover the solvent used in the production of a polyarylene sulfide from this mixed liquid, it is necessary to remove the above impurities from the mixed liquid.

For recovering the solvent used in the production of a polyarylene sulfide, by removing the impurities from the mixed liquid, a method has been proposed which comprises subjecting the reaction mixture, after the polymerization reaction of polyarylene sulfide, to adiabatic flashing at a high temperature condition to volatilize the solvent (Japanese Patent Kokai No. 61-53324 and U.S. Pat. No. 3,941,664).

However, the above method suffers from the problems that (1) the flashing tank requires special means, such as a specific stirring means, evaporation means, heat source, and means for feeding solids such as polymerization aids and thus the recovery cost increases, and thus the solvent used in the production of polyarylene sulfide cannot be efficiently recovered further (2) much of unvolatilized solvent used for the production of polyarylene sulfide remains unfleshed and hence the solvent cannot be recovered in high yield.

Another method has been proposed which comprises rectifying the mixed liquid by a rectification column to obtain a rectified solvent, used in production of a polyarylene sulfide, and a bottoms fractions (residue) of the rectification column, and subjecting the bottoms to evaporation to further recover the solvent remaining in the bottoms, thereby to increase recovery rate (Japanese Patent Kokai No. 62-253,624)..

However, this method also has the following problems: (1) Generally, the mixed liquid contains solid matters, such as oligomers and polymerization aids, which are soluble in the solvent, and they are apt to cause blocking of the rectification column and so the solvent cannot be stably recovered. Especially when the mixed liquid contains a polymerization aid, normally solid matters are contained in a larger amount in the mixed liquid and hence the phenomenon of preventing stable recovery is more conspicuous. (2) The composition of the mixed liquid is changed, operating conditions of the rectification column vary and correction thereof takes time, and thus the solvent cannot be recovered continually and efficiently.

SUMMARY OF THE INVENTION

The present invention has been accomplished under the above circumstances.

That is, an object of the present invention is to provide a method for efficient and stable recovery of the solvent used in the production of polyarylene sulfide, said method being free from the above-mentioned problems of conventional techniques.

As a result of intensive research conducted by the inventors to solve the above problems, it has been found that the above object can be attained by carrying out specific treatments in a specific combination, and the present invention has thus been accomplished.

That is, the aspect of this invention is a method for recovery of a solvent used in the production of a polyarylene sulfide, characterized in that a mixed liquid, which is produced in the steps of the production of polyarylene sulfide, and which is mainly composed of a solvent, is subjected to a flashing evaporation to separate the mixed liquid into a flashed vapor (A) and a flashed residue (B), and the flashed vapor (A) is rectified.

In the above recovery method, the flashed residue (B) may be separated into an evaporated vapor (C) and an evaporated residue (D) using an evaporator having the ability to discharge a solid or a slurry of high viscosity and this evaporated vapor (C) may be rectified.

Furthermore, in the above recovery method, the flashed vapor (A) and the evaporated vapor (C) may be rectified by the same rectification column, and in this case the flashed vapor (A) and the evaporated vapor (C) may be previously mixed and the mixture may be rectified.

Furthermore, the flashed vapor (A) and the evaporated vapor (C) may be fed to the same rectification column at different positions, depending on their compositions, to perform the rectification.

DESCRIPTION OF THE PREFERRED EMBODIMENTS

Figure 1:
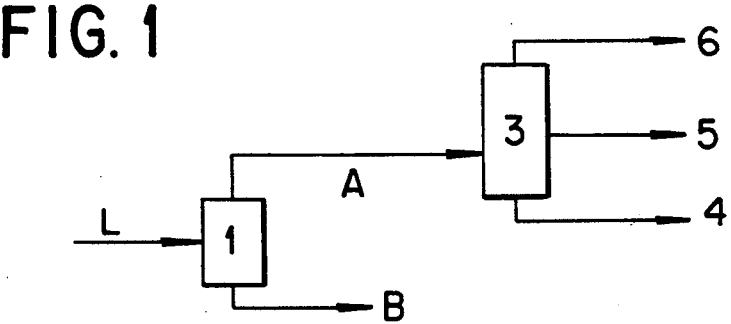
FIGS. 1, 2 and 3 are flow sheets of recovery of solvents, used in production of polyarylene sulfide, used in the different aspects of the working examples of the present invention.

The method of the present invention will be explained in the order of: flash evaporation operation, separation using an evaporator the and rectification.

Flash Evaporation Operation

This flash evaporation operation separates a mixed liquid, mainly composed of used solvent which was generated during the steps of production of a polyarylene sulfide, into a flashed vapor (A) and a flashed residue (B).

The mixed liquid mainly composed of the solvent which was used in the production of a polyarylene sulfide and generated during the steps of producing polyarylene sulfide, includes for example, a solvent solution obtained by subjecting a reaction mixture, after the polymerization reaction which produces a polyarylene sulfide, to solid-liquid separation; a washing liquid, generated at the step of washing the solid matter containing polyarylene sulfide which was obtained from the solid-liquid separation; a mixed liquid, comprising the above solvent liquid and the above washing liquid; a solvent liquid obtained by further subjecting the above washing liquid to solid-liquid separation the above solvent liquid; or the above mixed liquid; and a mixture of these various solvent liquids.

Generally, the mixed liquid is mainly composed of the solvent used in the production of a polyarylene sulfide and in addition contains water, unreacted monomers, polymerization aids, oligomers, solvent deteriorated products, alkali metal salts, and solvents other than the polymerization solvent, such as acetone.

The solvent used for the production of a polyarylene sulfide is one normally used for the polymerization of a polyarylene sulfide and includes, for example, organic amide compounds, lactam compounds, urea compounds, and cyclic organophosphorus compounds. As examples of the solvent, mention may be made of N,N-dimethylformamide, N,N-dimethylacetamide, N,N-diethylacetamide, N,N-dipropylacetamide, N,N-dimethylbenzoic acid amide, caprolactam, N-methylcaprolactam, N-ethylcaprolactam, N-isopropylcaprolactam, N-isobutylcaprolactam, N-n-propylcaprolactam, N-n-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-cyclohexyl-2-pyrrolidone, N-ethyl-3-methyl-2-pyrrolidone, N-methyl-3,4,5-trimethyl-2-pyrrolidone, N-methyl-2-piperidone, N-isopropyl-2-piperidone, N-methyl-2-piperidone, N-ethyl-2-piperidone, N-isopropyl-2-piperidone, N-methyl-6-methyl-2-piperidone, N-methyl-3-ethyl-2-piperidone, tetramethylurea, N,N'-dimethylethyleneurea, N,N'-dimethylpropyleneurea, 1-methyl-1-oxosulfolane, 1-ethyl-1-oxosulfolane, 1-phenyl-1-oxosulfolane, 1-methyl-1-oxophospholane, 1-n-propyl-1-oxophospholane, and 1-phenyl-1-oxophospholane.

The above-mentioned mixed liquid may contain one of these solvents or two or more of them.

In many cases, the mixed liquid contains non-protonic organic amides or lactams and among them, N-alkylpyrrolidones, especially N-methylpyrrolidone are contained.

The mixed liquid usually contains the solvent used in the production of a polyarylene sulfide in an amount of 80–99% by weight and contains substantially no polyarylene sulfide. Especially when the content of the solvent is 90–99% by weight, within the above range, flash evaporation is easy and the effect of the present invention can be more easily exhibited.

When the mixed liquid contains unreacted monomers, the content of the reacted monomers in the mixed liquid is normally 0.1–2.0% by weight.

When the mixed liquid contains water, the content of the water in the mixed liquid is normally 0.1–5.0% by weight.

When the mixed liquid contains solvent deterioration products, the content of the solvent deterioration products is usually 0.1% by weight or less.

When the mixed liquid contains oligomers, the content of the oligomers in the mixed liquid is usually 0.1–2.0% by weight.

When the mixed liquid contains polymerization aids, the content of the polymerization aids in the mixed liquid is usually 3.5% by weight or less.

When the mixed liquid contains alkali metal salts, the content of the alkali metal salts is usually 0.1–5.0% by weight.

When the mixed liquid contains solvents other than those used for the production of polyarylene sulfide, the content of these solvents is usually 5.0% by weight or less.

In the above flash evaporation operation, the mixed liquid is heated to 100°–220° C., preferably 130°–180° C. and is then transferred into a flash drum at 50–760 Torr, preferably 50–300 Torr, in internal pressure.

If the elevated temperature of the mixed liquid is lower than 100° C., the separation efficiency between the flashed vapor (A) and the flashed residue (B) is inferior. On the other hand, if the elevated temperature is higher than 220° C., the solvent used in the production of the polyarylene sulfide is deteriorated. If a heating source is provided in the flashing drum, and the internal temperature of the flashing drum is adjusted to 100°–220° C., the mixed liquid can be introduced, as it is, into the flashing drum without previously heating the mixed liquid to 100°–220° C.

If the internal pressure of the flashing drum is lower than 50 Torr, a high performance and more expensive apparatus must be used as a vacuum unit used for the flashing drum, and the cost is increased. If the internal pressure is higher than 760 Torr, the separation efficiency between the flashed vapor (A) and the flashed residue (B) decreases.

The flashed vapor (A), obtained by the flash evaporating operation, generally contains the solvent used for production of polyarylene sulfide, unreacted monomers, water, and, in some case, other solvents such as acetone.

When the content of the solvent, used for the production of a polyarylene sulfide in the flashed vapor (A) is normally 90–99.9% by weight and, especially when it is 95–99.9% by weight, the effect of the present invention can be more highly exhibited.

The flashed residue (B) normally contains the solvent used for the production of a polyarylene sulfide, solvent deterioration products, oligomers, and polymerization aids, such as alkali metal halides, alkali metal salts and the like.

The content of the solvent for the production of a polyarylene sulfide in the flashing residue (B) is usually 5–90% by weight. Separation by an evaporator:

According to the present invention, the solvent used for the production of a polyarylene sulfide can be efficiently recovered by rectifying the flashed vapor (A) obtained by the flash evaporating operation, and it can be more efficiently recovered by rectifying the flashed vapor (A) and the evaporated vapor (C) separated from the flashed residue (B) by separation using this evaporator.

The flashed residue (B) is separated into the evaporated vapor (C) and the evaporated residue (D) by a separating operation carried out by this evaporator.

A solid or highly viscous slurry is discharged from the evaporator as the evaporated residue (D).

The evaporator used preferably has (1) the ability to carry solid or highly viscous slurry, produced upon the decrease of the organic solvent in evaporated residue (D), to an outlet without depositing it (a self-cleaning function) or (2) the ability to make the amount of useful solvent remaining in the evaporated residue (D) as small as possible by highly efficient heat transfer and interfacial renewal.

As evaporators satisfying these requirement, mention may be made of vertical or horizontal thin film type evaporators and single-axis or horizontal rotor evaporators having one or more rotors.

The operating conditions of the evaporators are usually temperature: 100°-260° C., preferably 150°-220° C., and pressure: 50-760 Torr, preferably 50-300 Torr. However, higher temperature and higher vacuum, than the operating conditions for the above-mentioned flashing evaporation, are preferred for improvement of the efficiency for recovery of the solvent used for the production of a polyarylene sulfide.

Retention time (separation time) is preferably as short as possible in order to prevent the deterioration of the solvent used for production of a polyarylene sulfide, but usually is 1 minute- 5 hours.

The flashed residue (B) is supplied from the flash evaporating operation, and normally contains the solvent used in production of a polyarylene sulfide, solvent deterioration products, oligomers, and polymerization aids, such as alkali metal halides, alkali metal salts, etc.

The evaporated vapor (C) normally contains the solvent used in production of a polyarylene sulfide, and solvent deterioration products, etc.

The evaporated residue (D) normally contains oligomers, solvent deterioration products, and polymerization aids, such as alkali metal halides, alkali metal salts, etc.

Rectification

According to the present invention, the solvent used for the production of a polyarylene sulfide can be efficiently recovered by rectifying the flashed vapor (A) obtained by the flash evaporating operation.

For further efficient recovery of the solvent used in the production of a polyarylene sulfide, it is preferred to rectify the flashed vapor (A) obtained by a flash evaporating operation and the evaporated vapor (C), obtained by, separating operation, which uses an evaporator.

In this case, the flashed vapor (A) and the evaporated vapor (C) may be rectified separately by rectification columns, but when most of the flashed vapor (A) and the evaporated vapor (C) comprise the solvent used in the production of a polyarylene sulfide, especially when more than 90% of each of (A) and (C) is the solvent used in the production of a polyarylene sulfide, it is preferred to carry out the rectification in the same rectification column for reducing the number of apparatus. When the rectification is carried out in the same rectification column, it is preferred to mix the flashed vapor (A) and the evaporated vapor (C) before feeding them to the rectification column and to carry out rectification of this mixture in the rectification column in order to reduce the necessity to control variables. Furthermore, when the composition of the flashed vapor (A) and that of the evaporated vapor (C) are considerably different, it is preferred to feed them at respective positions corresponding to their respective compositions from the point of rectification efficiency.

Others

In many cases, polymerization aids are used in the production (polymerization) of a polyarylene sulfide for increasing its molecular weight. As polymerization aids, there may be used alkali metal halides (such as lithium chloride), carboxylic acid metal salts (such as lithium acetate), and the like.

Generally, the polymerization aid is used in nearly equimolar amount to the starting monomer and thus a considerable amount of polymerization aid is present in the solvent and so if this is fed directly to a rectification column, there often occur troubles such as blocking and sticking.

Therefore, the method for recovery of the solvent used for the production of a polyarylene sulfide according to the present invention is especially effective when the polyarylene sulfide is free of polymerization aids.

Moreover, the polymerization aids are generally expensive and must be recovered and, reused and since the main component of the evaporated residue (D) is the polymerization aid, the present invention also has an the effect of making it easy to recover the polymerization aid.

According to the present invention, the solvent used in the production of a polyarylene sulfide can be further effectively recovered by connecting the flashing drum in a flash evaporating operation and the evaporator, in separation by an evaporator, and providing, for example, a valve between the flashing drum and the evaporator, thereby to enhance the degree of reduction of pressure.

The present invention will be explained in more detail by the following examples.

EXAMPLE 1

Recovery of the solvent which was used for the production of a polyarylene sulfide was carried out according to the steps (operation) as shown in FIG. 1.

Mixed liquid L which was generated from the step of the production of a polyarylene sulfide and was composed of the components as shown in Table 1 and was mainly composed of N-methyl-2-pyrrolidone, was heated to 200° C., was fed to a flashing drum 1 (capacity 0.5 m$^3$) having an internal temperature of 160° C. and a pressure of 70 Torr. and was separated into a flashed vapor A and a flashed residue B.

The flashed vapor A was fed to the rectification column 3 where it was separated into an overhead distillate 6, a bottoms 4 and a purified NMP 5 which was a side cut fraction.

The purified NMP 5 was used as a reaction solvent for the preparation of a polyphenylene sulfide (PPS), and reaction proceeded with no troubles to obtain a PPS having the desired properties.

No troubles, such as blocking, occurred in the rectification column 3 after continuous operation of several months.

Results of the analysis of the components contained in the mixed liquid L; flashed a vapor A, flashed a residue B, and a purified NMP 5 are shown in Table 1.

The mixed liquid L was a part of a combined mixed liquids obtained in a plurality of productions of polyarylene sulfide (polyphenylene sulfide; PPS). The mixed liquid L in the following Example 2 was the same as that in this Example.

One example of the preparation of the above polyphenylene sulfide is explained below.

9.13 kg (54.3 mol) of sodium sulfide pentahydrate, 2.3 kg (54.3 mol) of lithium chloride and 30 liters of N-methyl-2-pyrrolidone were charged into an autoclave and water was distilled off at 160° C. under reduced pressure. Thereafter, thereto were added 10 liters of N-methyl-2-pyrrolidone and 7.98 kg (54.3 mol) of p-dichlorobenzene and reaction was allowed to proceed at 260° C. for 3 hours to obtain a reaction mixture.

This reaction mixture was cooled and filtered off, by a stainless steel sieve of 140 meshes, to obtain granular polyphenylene sulfide. This granular product was washed with 20 liters of N-methyl-2-pyrrolidone to obtain white polyphenylene sulfide having an inherent viscosity $\eta$inh: 0.335 [temperature 206° C., a-chloronaphthalene, concentration 0.4 g/dl] and a sodium ion content of 210 ppm, in a yield of 92.5%.

EXAMPLE 2

Figure 2:
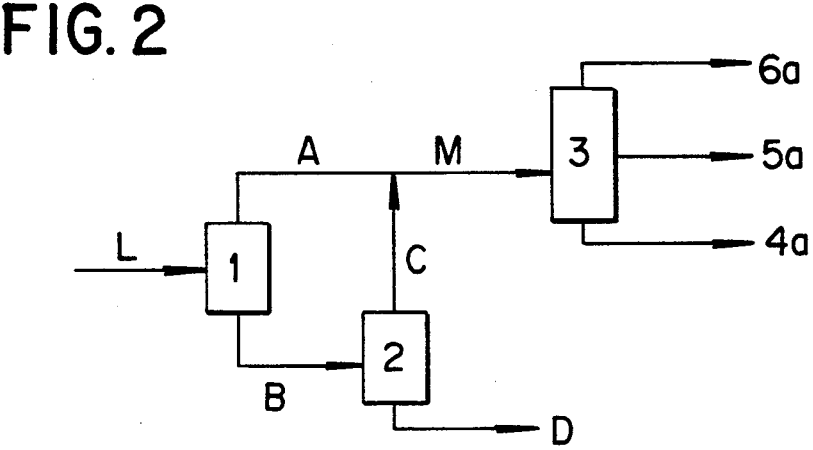

A solvent used for the production of a polyarylene sulfide was recovered according to the steps (operation) as shown in FIG. 2.

A mixed liquid L, having the composition as shown in Table 1 and mainly composed of NMP and produced from respective steps for producing PPS, was fed to a flashing drum 1 (capacity 0.5 m$^3$) which was adjusted to an internal temperature of 140° C. and a pressure of 100 Torr, and was separated into a flashed vapor A and flashed residue B.

The flashed residue B was fed to a vertical cylindrical evaporator 2 (heat transfer surface area 0.5 m$^2$) provided with a rotor for the formation of a thin film and a jacket for heating and was separated into an evaporated vapor C and an evaporated residue D under the conditions of 240° C. and 100 Torr.

A flashed vapor A and an evaporated vapor C were mixed, and the mixture was fed to a rectification column 3 as a mixed vapor M and separated into an overhead distillate 6a, a bottoms 4a and a purified NMP fraction 5 which was a side cut fraction.

The purified NMP 5a was used as a reaction solvent and the reaction proceeded with no special troubles to obtain PPS having the desired properties.

No troubles, such as blocking, occurred in rectification column 3 even after continuous operation therefore for several months.

Results of analysis of components contained in the mixed liquid L, the flashed vapor A, the flashed residue B, the evaporated vapor C, the evaporated residue D, and the purified NMP 5a are shown in Table 1.

EXAMPLE 3

Figure 3:
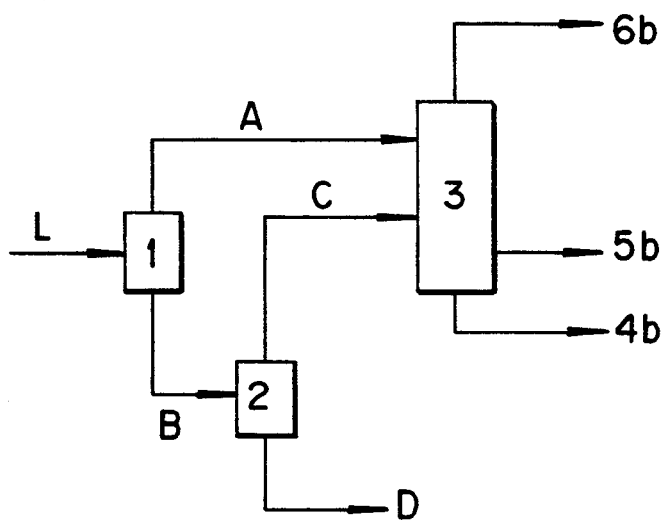

A solvent used for the production of a polyarylene sulfide was recovered by the steps (operation) shown in FIG. 3.

In this Example, the procedure was carried out under the same conditions as in Example 2 except that the flashed vapor A and the evaporated vapor C were not mixed, but were separately fed to the rectification column 3. Even when the composition of vapor A and that of C were greatly different, the solvent was able to be efficiently recovered by the rectification column 3 with the same performance. The results are shown in Table 1.

TABLE 1

(unit: kg/hour)

| | Component | NMP | Light components (water, etc.) | Heavy components (LiCl, NaCl, oligomers, NMP deterioration products) | Total amount |
|---|---|---|---|---|---|
| Ex. 1 | Mixed solvent L | 40.0 | 3.5 | 14.0 | 57.5 |
| | Flash vapor A | 34.2 | 3.5 | — | 37.7 |
| | Flash residue B | 5.8 | — | 14.0 | 19.8 |
| | Purified NMP 5 | 34.2 | 0.2 | — | 34.4 |
| Ex. 2 | Mixed solvent L | 61.2 | 1.9 | 3.0 | 66.1 |
| | Flash vapor A | 31.1 | 1.9 | — | 33.0 |
| | Flash residue B | 30.1 | — | 3.0 | 33.1 |
| | Evaporator vapor C | 29.95 | 0.03 | — | 29.98 |
| | Evaporator residue D | 0.15 | — | 2.97 | 3.12 |
| | Purified NMP 5a | 60.9 | 0.3 | — | 61.2 |
| Ex. 3 | Mixed solvent L | 65.5 | 7.5 | 7.0 | 80.0 |
| | Flash vapor A | 37.5 | 7.5 | — | 45.0 |
| | Flash residue B | 28.0 | — | 7.0 | 35.0 |
| | Evaporator vapor C | 27.6 | — | — | 27.6 |
| | Evaporator residue D | 0.4 | — | 7.0 | 7.4 |
| | Purified NMP 5b | 64.6 | 0.3 | — | 64.9 |

According to the present invention, a flash evaporation operation and rectification operation are combined and hence a method for recoverying a solvent used for the production of a polyarylene sulfides which has the following merits, can be provided:

(1) An efficient recovery can be attained because specially complicated equipment is not necessary.

(2) There occur no troubles, such as blocking of the rectification column, and no deterioration of the solvent is caused, and the solvent can be stably recovered.

(3) Continuous operation of the recovery can be easily performed.

Furthermore, when a flash evaporating operation, an evaporator evaporating operation and rectifying operation are combined, a method for the recovery of a solvent used for the production of a polyarylene sulfides which has the following merits, can be provided:

(1) An efficient recovery can be attained, because special complicated equipment is not necessary.

(2) Efficient recovery can be attained because the amount of the solvent used for the production of a polyarylene sulfides, which is not recovered from the mixed liquid (containing the solvent as main component) and is retained, is small and thus the recovery rate is high.

(3) There occur no troubles, such as blocking of the rectification column, and stable recovery can be attained.

(4) Continuous operation of the recovery can be easily performed.

(5) The separation and recovery of polymerization aids are easy.

What is claimed is:

1. A method for recovering a solvent used in producing a polyarylene sulfide which comprises:

separating, from a polyarylene sulfide product, a mixed liquid, mainly composed of solvent used in the production of the polyarylene sulfide and materials generated while producing the polyarylene sulfide;

flashing said mixed liquid to separate the mixed liquid into a flashed vapor (A), containing said solvent, and a flashed residue (B);

then rectifying the flashed vapor (A); and recovering said solvent as a stream from said rectification.

2. A method according to claim 1, wherein the content of the solvent in the mixed liquid is 80–99% by weight.

3. A method according to claim 1, wherein the mixed liquid contains an alkali metal halide or a carboxylic acid metal salt as a polymerization aid.

4. A method according to claim 1, wherein the flashing is carried out at a temperature of 100°–220° C. and an internal pressure of 50–760 Torr.

5. A method according to claim 1, wherein the flashed residue (B) is separated into an evaporated vapor (C), containing said solvent, and an evaporated residue (D) by evaporation in an evaporator, and rectifying the evaporated vapor (C).

6. A method according to claim 5, wherein said evaporation is carried out at a temperature of 100°–260° C. and an internal pressure of 50–760 Torr.

7. A method according to claim 5, wherein the flashed vapor (A) and the evaporated vapor (C) are subjected to common rectification.

8. A method according to claim 5, wherein the flashed vapor (A) and the evaporated vapor (C) are mixed before rectification and then the mixture is rectified.

9. A method as claimed in claim 7, including feeding the flashed vapor (A) and the evaporated vapor (C) to different positions in a single rectification column, wherein the positions at which the (A) and (C) are fed to said column are determined as a function of the compositions of the respective vapors.

* * * * *